United States Patent [19]

Sugitani

[11] 4,412,224

[45] Oct. 25, 1983

[54] METHOD OF FORMING AN INK-JET HEAD

[75] Inventor: Hiroshi Sugitani, Machida, Japan

[73] Assignee: Canon Kabushiki Kaisha, Tokyo, Japan

[21] Appl. No.: 325,822

[22] Filed: Nov. 30, 1981

[30] Foreign Application Priority Data

Dec. 18, 1980 [JP] Japan ................................ 55-180202

[51] Int. Cl.[3] ............................................ G01D 15/18

[52] U.S. Cl. ................................ 346/1.1; 346/140 R

[58] Field of Search ............................. 346/140 R, 1.1

[56] References Cited

U.S. PATENT DOCUMENTS 4,189,734 2/1980 Kyser ........................ 346/140 R X 4,251,824 2/1981 Hara ............................ 346/140 R

OTHER PUBLICATIONS

Gardner, William R.; Process for Fabrication of Ink Jet Orifices; Xerox Disclosure Journal; vol. 4, No. 2, Mar.-/Apr. 1979, pp. 251-252.

*Primary Examiner*—Joseph W. Hartary

*Attorney, Agent, or Firm*—Fitzpatrick, Cella, Harper & Scinto

[57] ABSTRACT

An ink-jet head comprising a multi-arrayed ink flow path and ink discharging nozzles, and the ink flow paths are formed according to photo-forming technique.

5 Claims, 14 Drawing Figures

METHOD OF FORMING AN INK-JET HEAD

BACKGROUND OF THE INVENTION

1. Field of the Invention

The present invention relates to an ink-jet head and, particularly, to an ink-jet head used for generating droplets of ink for a so-called "ink-jet recording system".

2. Description of the Prior Art

An ink-jet head, which is adopted in ink-jet recording systems, is generally provided with a fine ink discharging port (or orifice), an ink flow path, and elements for generating an ink discharging pressure arranged in the ink flow path.

Heretofore, there have been known various methods for fabricating ink-jet heads, for example, a method comprising shaping fine grooves on a plate of glass or metal by cutting or etching and then bonding or pressing the plate thus processed to another appropriate plate to form ink flow paths.

Ink-jet heads produced by the conventional methods suffer from the following drawbacks.

An ink flow path having a constant resistance to flowing ink is hardly obtained due to roughness of the interior wall surface of the ink flow path when it is fabricated by cutting, or due to stains on the flow path which is caused according to the difference in the etching rate. Consequently, ink-jet properties of the resulting ink-jet head would be varied.

Also in a cutting process, the plate is liable to be broken or cracked resulting in lowering the production yield, and in etching process, many steps are disadvantageously required resulting in a high production cost.

In addition, the above mentioned conventional methods suffer from the drawbacks that positioning of a grooved plate and a lid plate provided with a driving element for generating an energy actuating the ink such as a piezoelectric element, a heat generating element and the like is very difficult resulting in a low rate of mass production and the performance of the resulting ink-jet head fluctuates. Accordingly, development of an ink-jet head capable of satisfactorily solving the above defects is earnestly desired.

SUMMARY OF THE INVENTION

The present invention eliminates the foregoing defects.

It is an object of the present invention to provide an ink-jet head which is of low cost, accurate and highly reliable with respect to ink-jet properties.

It is another object of the present invention to provide an ink-jet head comprising ink flow paths which are finely formed with precise and accurate dimensions, and have a high yield of formation and which passes stable ink-jet properties.

It is a further object of the invention to provide the ink-jet head which comprises a so-called "multi-arrayed ink nozzles" which maintains ink-jet properties without having deviations thereof.

According to the present invention, there is provided an ink-jet head comprising an ink flow path and an ink ejecting nozzle for discharging an ink at one end of the ink flow path characterized in that the ink flow path is formed by a groove produced at the surface of a substrate by a photoforming technique.

DESCRIPTION OF THE PREFERRED EMBODIMENTS

The term of "photo-forming" used in the present invention means a precision forming method in which phototechniques, such as printing patterns on a photosensitive film, are utilized together with etching and plating techniques as explained in the following examples.

The present invention will be illustrated with reference to the accompanied drawings.

Figure 9:
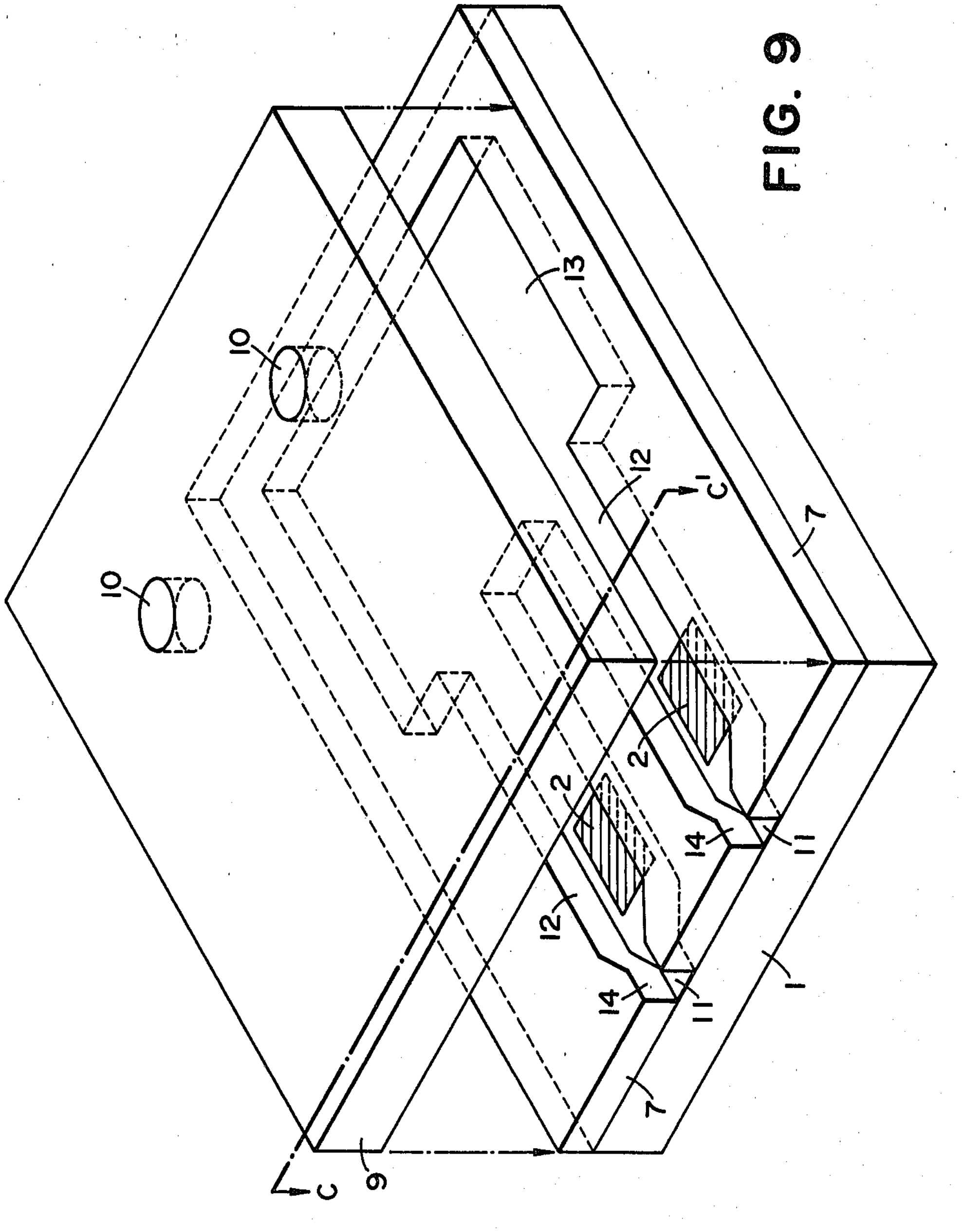

These drawings, except FIG. 9, show a schematic cross section for explaining the present invention.

Referring to FIGS. 1 to 9 showing the fabrication steps of the ink-jet head, the first embodiment of the invention is demonstrated below.

Figure 1:
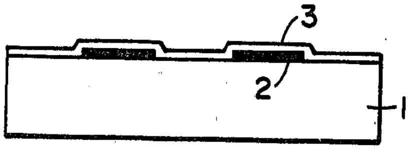
FIGS. 1–9 illustrate an example of steps for forming the ink-jet head of the present invention.

Referring to FIG. 1, desired number of elements 2 which generate ink discharging pressure, such as exothermic element, piezoelectric element, and the like, are arranged on a substrate 1 made of glass, ceramics, plastics, metals or the like, and if necessary, an ink-resistive or a dielectric thin film 3 of $SiO_2$, $Ta_2O_5$, glass or the like, is applied thereto. The element 2 is further connected to an electrode for input signal (not shown).

Figure 2:
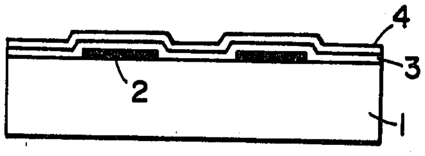

Referring to FIG. 2, as an electrically conductive film 4, a thin film of Cu, Ni, Cr, Ti or the like is formed on the substrate having the above mentioned element 2 by means of vacuum deposition, sputtering, chemical plating, or the like. The electrically conductive film 4 thus formed serves to enhance the intimate contacting with a plated layer 7 (cf. FIG. 5).

Figure 3:
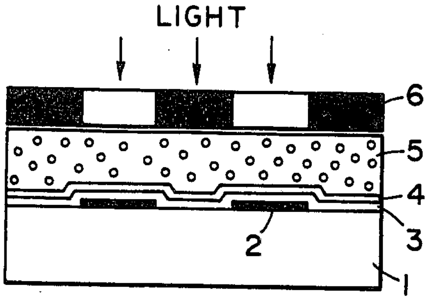

Referring to FIG. 3, after cleaning and drying the surface of the substrate having elements 2, dry film 5 of photoresist material of about 25–50μ in thickness and heated to about 80°–105° C., is laminated onto the substrate, at a rate of 0.5–4 feet/minute under a pressure of 1–30 $kg/cm^2$. At this step, the dry film photoresist 5 is fused and fixed over the surface of the substrate, and does not exfoliate from the surface even when an external pressure is applied thereto to some extent.

Subsequently, as shown in FIG. 3 after placing a photomask 6 having an appropriate pattern on the dry film photoresist 5 provided on the substrate, the resist is then exposed through the photomask 6. It is necessary that the position of the pattern and the position of the pressure generating element should be aligned by a conventional method.

Figure 4:
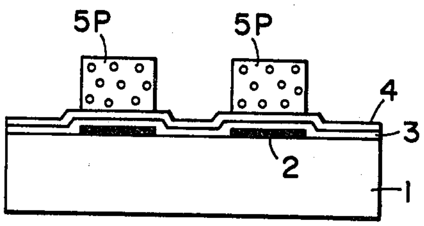

FIG. 4 schematically shows a state after removing unexposed portion, i.e. uncured part, from the exposed dry film photoresist 5 by dissolving with a specific developing liquid. At this point, a so-called "side etching" is not caused and there can be achieved a higher accuracy processing than in a usual process.

Figure 5:
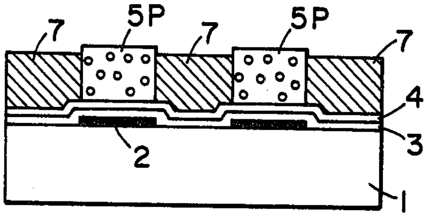

Referring to FIG. 5, the substrate, except a resist pattern 5P, is electrically plated with Ni or Cu until the electroplated layer 7 reaches a desired thickness.

Figure 6:
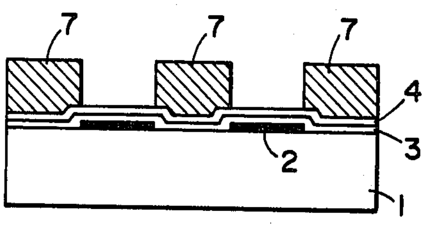

In the electroplating process above, an electroplating bath to be used for stressless deposition is preferably copper pyrophosphate bath for copper plating, and Watts bath for nickel plating.

Where smoothness of the plating surface and uniformity of plating thickness are taken into account, it is effective to apply abrasive grinding to the surface prior to removing photoresist pattern 5P (the step in FIG. 6).

The FIG. 6 shows a schematical drawing after removing where the said photoresist pattern 5P has been removed.

Figure 7:
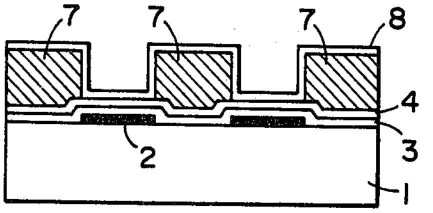

In the step of FIG. 7, if a plated layer 7 which is previously formed by electroplating, i.e. nickel or copper metal, is reacted with an ink to deteriorate the ink itself, a noble metal such as Au, Rh, Pt and the like is further plated in the thickness of 0.5–5μ to form an ink-proof layer 8 which prevents such a reaction. It is, of course, unnecessary to apply this treatment if an ink to be used in the ink-jet head of the present invention is not reactive with Ni or Cu.

Figure 8:
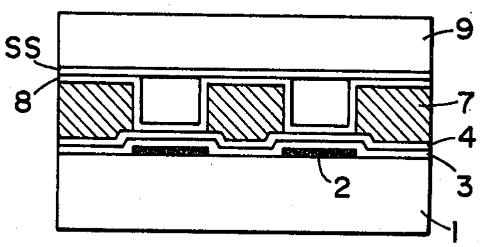

Following these steps, a plate 9 which acts as a ceiling, is attached to the surface of the thus processed substrate 1 on which an interior surface of the ink flow path is formed, as shown on FIG. 8, by adhesion or press fitting.

A typical process for adhesion may be as follows.

(1) After spinner coating a plate 9 of glass, ceramics, metals, plastics or the like, with an adhesive of epoxy type resin, in the thickness of 3–4μ, the adhesive SS (in FIG. 8) is semi-cured (so-called "B-stage") by heating and then adhesively bonded onto the plated layer 7 followed by fully curing the adhesive SS; or (2) A plate 9 of a thermoplastic resin, such as acrylic resin, ABC resin, polyethylene and the like, is heated and directly fused onto the above plated layer 7.

A perforated hole 10 is provided as shown in FIG. 9 to connect to an ink supplying tube (not shown).

After integrating the substrate 1, having grooves for fine ink flow paths 12 and ink supplying room 13, with the plate 9, the body thus integrated is cut along a dot-and-dash line C—C′ in FIG. 9. The cutting is made to optimize the distance between the element 2 for generating ink-jet pressure and an ink-jet nozzle 11, and a region to be cut may be appropriately selected. In the cutting process, any dicing technique usually utilized in semiconductor industry may be adopted. Subsequently, the cutting section is ground to make smooth the surface, and an ink supply tube (not shown) is fixed to the through hole 10 to complete the ink-jet head.

A photosensitive composition, i.e. photoresist, used in the above example is a dry film type, i.e. a solid state, but the present invention is not limited to solid type photoresists, but a liquid type photoresist may also be utilized.

Where a liquid type photoresist is used for forming a film of photosensitive composition on the substrate, a squeezing method may be used. The so-called "squeezing method" is a process typically used in forming a relief image. According to the squeezing method, a substrate is surrounded by a wall of the same height as that of the desired thickness of the photosensitive composition and an extra amount of the composition is removed by squeezing. In this case, viscosity of the photosensitive composition, preferably ranges from 100 to 300 cps, and the height of the wall surrounding the substrate is to be determined in consideration of the decreasing amount of the composition due to solvent evaporation.

On the other hand, where the photosensitive composition is in a solid state, a sheet of the composition adheres onto the substrate by hot-pressing. In the present invention, a solid film-type photoresist is more advantageous for handling and easy and precise control of the thickness thereof.

Among such a solid type photosensitive compositions, there are included those commercially available from Du pont de Nemour Co. under tradenames of "RISTON" 210R, 218R, 215, 3010, 3020, and the like and from Hitachi Kasei Co., Ltd. under tradenames of PHOTEC 860A-25, 860AFT, 140FT, and the like.

Beside these, there may be used photosensitive compositions, such as a mixture of 0-naphthoquinone diazide and a novolac-type phenolic resin, poly(vinyl cinnamate) resin, and cyclized rubber-azide series resin, and further, most of the resins commonly used in the field of ordinary photolithographic technique may be used. Generally, a photosensitive composition of AZ series of Shiysley's products and OMR series of Tokyo Oka's products are mostly recommended.

Another embodiment of the present invention is illustrated in FIGS. 10–14.

Figure 10:
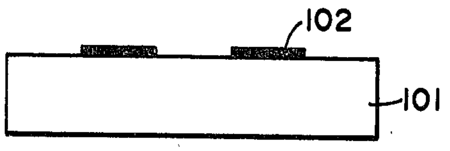
FIGS. 10–14 illustrate an alternative example of the steps.

FIG. 10 is a cross-sectional schematic drawing showing an element 102 for generating ink-jet pressure provided on a substrate 101.

Figure 11:
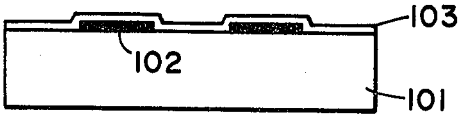
Figure 12:
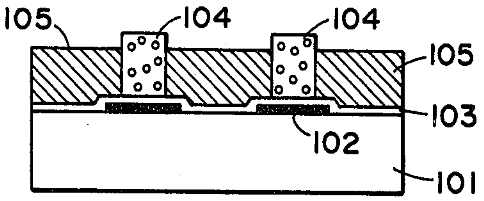
Figure 13:
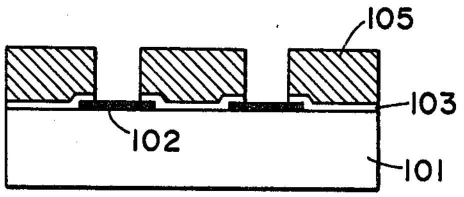
Figure 14:
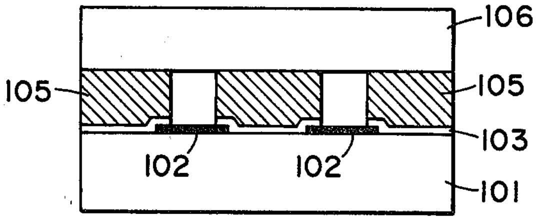

Referring to FIG. 11, the substrate of FIG. 10 is further processed to form an electrically conductive film 103 on the substrate 101 subjected to the process of FIG. 10, by a film forming means such as chemical plating, vacuum depositing, sputtering and the like. The electrically conductive film 103 of Cu, Ni, Cr or Ti may be used and is effective to obtain an intimate contact with a plating film 105 (cf. FIG. 12). Subsequently, a photolithographic process, as explained in the previous example, is carried out to form a photoresist pattern 104 at desired positions followed by electroplating to prepare a plating film 105 of Cu, Ni or the like (FIG. 12). The photoresist pattern 104 is then removed and an exposed part of the electrically conductive film 103 formed in the step of FIG. 11 for imparting electrical conductivity is also etched and removed (FIG. 13). After effecting the above steps, an ink-jet head is completed by adhering or merely press-fitting a plate 106 to the upper surface of the substrate 101 provided with grooves for ink flow paths as shown in FIG. 14.

In case that the ink ejected from the ink-jet head possesses electric conductivity or is chemically reactive with a material of a plated layer 105, a dielectric and corrosion resistive film, such as $SiO_2$, $Si_3N_4$, $Ta_2O_5$ and the like, (not shown) may be formed as an ink resistive layer of 2–5μ in thickness by vacuum deposition, sputtering, CVD or the like. In this example, it should be understood that an overall construction of the complete ink-jet head is almost similar to that as shown in FIG. 9, which is conveniently illustrated in an exploded view for better understanding.

Ink flow paths and ink-jet nozzles may be formed on the both sides of the substrate 1 or 101 according to the similar photo-forming process, as previously mentioned, though such an embodiment is not shown in the above examples.

The effects of the present invention which is explained in detail are summarized as follows:

(1) Since dimensional accuracy in forming the ink-flow path is extremely high, fluctuation of ink-jet properties in all nozzles is so small and each ink-jet property can be stably maintained for a long time.

(2) In the process for forming the ink-jet head, an adhesive is seldom used and a liquid etchant, i.e., a strong acid such as hydrofluoric acid, and the like is not used, and therefore, clogging of nozzle or ink flow paths and lowering of function due to the deterioration of the element for generating ink-jet pressure are not caused, and reliability in the performance is high.

(3) Since the main process for preparing the ink-jet head relies on the photo-forming, it is possible to manufacture many heads having stable and accurate dimensions simultaneously, and to provide efficiently a multi-arrayed ink-jet head of high density.

What I claim is:

1. A method for forming an ink-jet head comprising an ink flow path provided with an element for generating ink-jet pressure and having an ink ejecting nozzle, characterized in that said ink flow path and the nozzle are formed by a technique of "photo-forming" directly on a substrate having previously disposed thereon the element for generating ink-jet pressure.

2. A method for forming an ink-jet head according to claim 1, wherein said substrate includes a material selected from the group consisting of glass, ceramic, plastics and metals.

3. A method for forming an ink-jet head according to claim 1, wherein said ink flow path has an interior surface having a metal deposited by electric plating.

4. A method for forming an ink-jet head according to claim 1, wherein said ink flow path has an interior surface having a material selected from the group consisting of nickel and copper.

5. A method for forming an ink-jet head according to claim 1, wherein said substrate is provided with an electrically conductive film.

* * * * *